April 15, 1930.  P. KRUSE  1,754,955
GAUGE FOR SHEET SLITTERS AND THE LIKE
Filed July 22, 1927  2 Sheets-Sheet 2
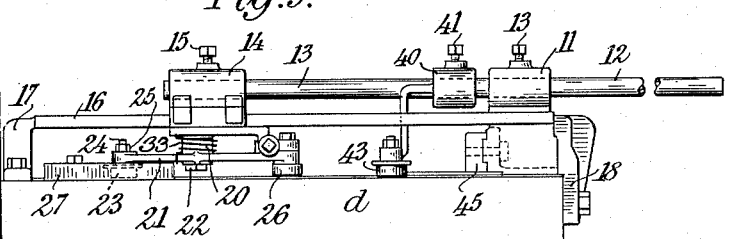
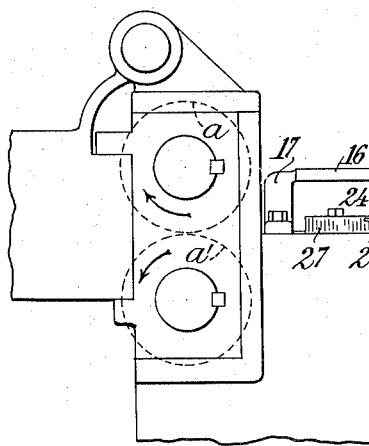
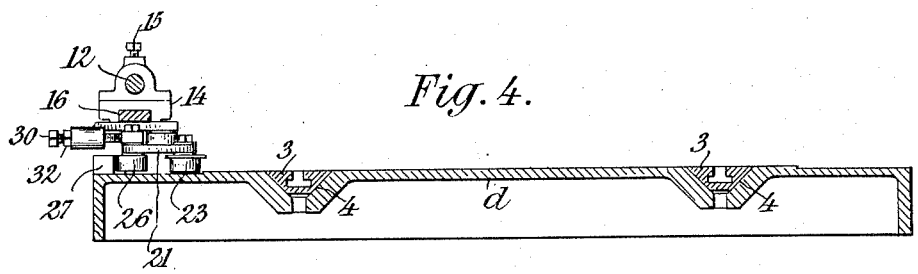
INVENTOR:
Peter Kruse,
By Attorneys, Patented Apr. 15, 1930

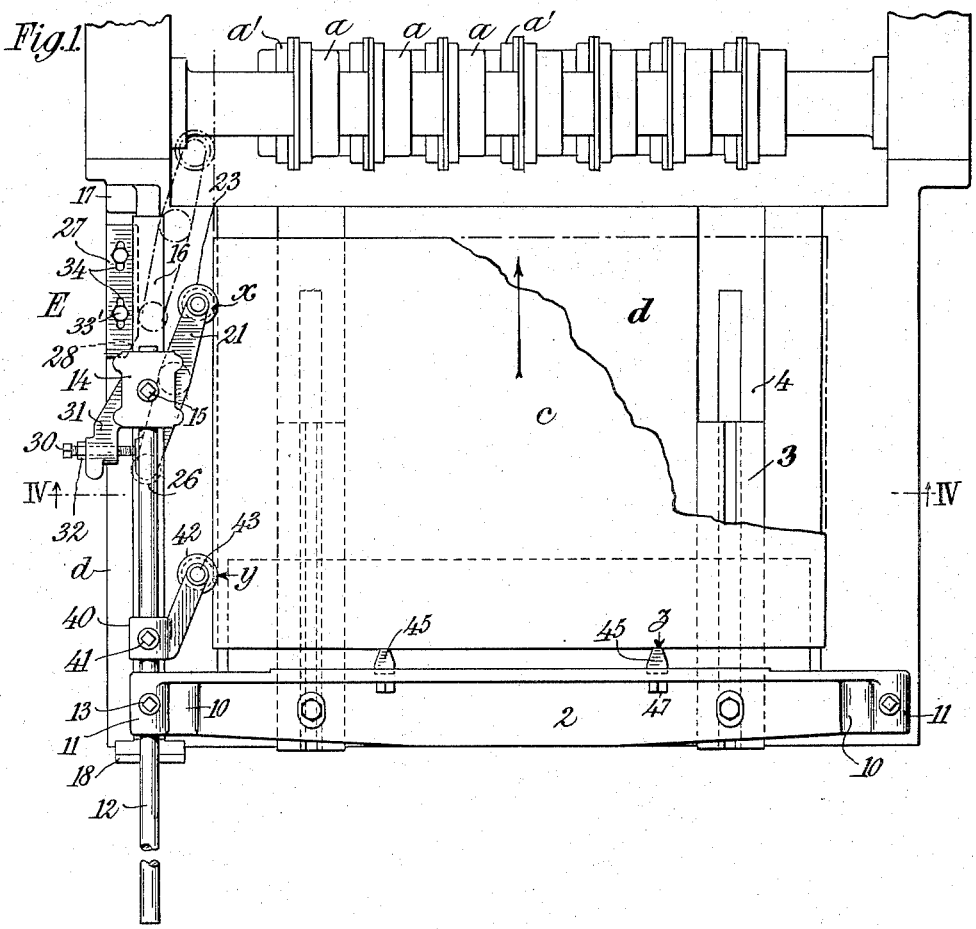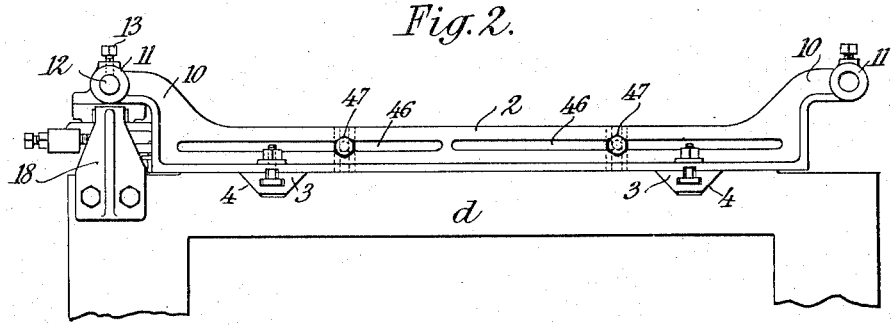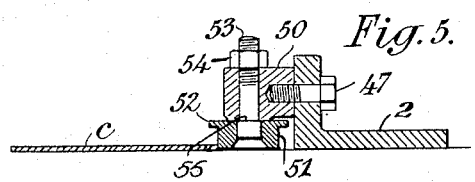

1,754,955

UNITED STATES PATENT OFFICE

PETER KRUSE, OF BROOKLYN, NEW YORK, ASSIGNOR TO E. W. BLISS COMPANY, OF BROOKLYN, NEW YORK, A CORPORATION OF DELAWARE

GAUGE FOR SHEET SLITTERS AND THE LIKE

Application filed July 22, 1927. Serial No. 207,595.

This invention relates to gauge devices which are used in conjunction with a mechanism for feeding sheets into the cutting rolls of a gang slitter or into any other type of machine wherein a sheet is subjected to some mechanical operation, such as trimming, rolling, punching or the like.

This invention has for its object to provide gauge members or gauge points which are adjustable along the edges of a sheet in such manner as to permit of their being brought into contact with such edges at points which bear definite relationship to particular markings or impressions on the sheet.

A further object of the invention is to provide a disappearing gauge member on a movable sheet feed, whereby said gauge member will be automatically shifted away from a side edge of a rectangular sheet after the position of the sheet has been determined by said gauge member, whereby when such sheet has been engaged by rolls or other means for advancing it independently of the feeding means of which the disappearing gauge forms a part, the sheet will not be subjected to deflecting forces heretofore resulting from the engagement of a transversely fixed side gauge member, with irregularities in the side edge of the sheet.

Further objects of the invention include constructional details of the gauging and feed mechanism, which will be set forth in the detailed description hereinafter to be given, in which reference is had to the accompanying drawings, and wherein:—

Figure 1 is a plan view of the device as applied to a gang slitter.

Fig. 2 is a front elevation of the mechanism shown in Fig. 1.

Fig. 3 is a side elevation of the same mechanism.

Fig. 4 is a vertical transverse cross-section taken along the line IV—IV of Fig. 1.

Fig. 5 is an enlarged fragmentary cross-section taken vertically through the feed bar 2 shown in Fig. 1, and illustrates a modified form of gauge member for the rear edge of the sheet.

The provision of the adjustable gauge points or gauge members according to the present invention permits of accurately positioning such gauge points to correspond exactly with points which have previously been employed as gauging points when the sheet was subjected to a prior operation, such, for example, as lithographing various designs or legends thereon. In this instance, if a sheet has been lithographed to provide the necessary markings for a plurality of can bodies, as is usual in the can making industry, it is highly important that the slitting of the sheet so marked should conform accurately to the lithographing thereon, not only to include the complete design on each separate blank cut from the sheet, but also to insure parallelism between the design and the edges of such blanks. It is the practice in lithographing sheets to accurately locate the multiple lithograph pattern with respect to three gauge points which engage the sheet on two edges. Inasmuch as the edges of raw sheet stock are oftentimes not perfectly true, it is important that when the lithograph sheet is transferred to another machine where a subsequent operation is performed upon it, that the sheet be gauged at exactly the same points in order that the second operation may be caused to properly register with the first. To this end the gauge device according to the present invention, provides a plurality of gauge points or gauge members which may be adjusted to engage sheets at points corresponding to the points originally employed in carrying out the first operation, which, in the example taken, is the lithographing of the sheet.

The adjustable gauge members, according to the present invention, form part of the feed mechanism whereby a sheet is introduced between the rolls of a machine, such as a gang slitter. In this particular adaptation of the invention the sheet will be automatically carried through the slitting rolls by the tractive effect of the rolls, once the sheet has been introduced between them. At such time the sheet will be drawn away from the gauge points at its rear edge by its rapid forward movement. There must, however, be a gauge point mounted well forward along one side edge of the feed in order to obtain accurate gauging or registering thereof, and the edge of the sheet will be drawn along this forward gauge member for a considerable distance as the sheet is advanced by the action of the rolls. If the edge which is thus caused to run along the forward gauge point were perfectly true and straight, there would be no disadvantage in permitting the forward gauge member to remain in contact with such edge during the entire movement of the sheet, but as has been pointed out, this is not the case. Any irregularities in the edge which is carried along the gauge point by the movement of the sheet, will, if such irregularities at any point cause the edge to swing toward the gauge point, result in swinging the sheet slightly to one side so that its further movement through the rolls will not be in alignment with its original line of motion, and the strips cut by the slitter will not have straight edges nor will the edges correspond to the lithographing. To avoid the difficulty above described, the forward gauge point is caused to be withdrawn or to disappear from the edge of the sheet at the moment the sheet is engaged between the rolls, and this is preferably accomplished automatically. The sheet having been once properly started through the rolls and in desired relationship thereto, requires no further guiding, and as a consequence, the automatic withdrawal of the forward gauge point results in the obtaining of perfectly cut blanks.

Referring to the drawings, the gauging and feeding mechanism according to the present invention, is, by way of example, shown as applied to a gang slitter of usual type, the slitting mechanism comprising a plurality of co-operating pairs of rotary shear wheels or rolls $a$, $a'$. These rolls are rotated as indicated by the arrows in Fig. 3, in such direction that they cause a sheet $c$ to be advanced from its initial position above a table or platform $d$ as it enters the rolls, finally ejecting the sheet from between them to the left in Fig. 3, or in the direction of the arrow in Fig. 1.

The feed mechanism whereby the sheet may be advanced from an idle position until it is engaged between the slitting rolls, comprises a transverse feed bar 2 which is mounted upon two longitudinal slides 3. These slides are preferably flush with the surface of the table or platform $d$ and operate in guideways 4 formed therein. The forward movement of the feed bar 2 carries the sheet toward the slitting rolls $a$, $a'$ and inserts the sheet therebetween, but as hereinbefore explained, the rolls thereafter advance the sheet so that the transverse feed bar may be returned to its original position to receive the next sheet. The reciprocation of the feed bar may be accomplished manually or automatically, in accordance with usual practice in machines of this type.

The feed bar 2 is provided at its right and left-hand ends with upwardly extending brackets 10, at the ends of which are carried collars 11 which are adapted to embrace a rod 12 upon which are mounted one or more gauge members, as will hereinafter be set forth. The brackets at opposite ends of the feed bar are alike, and only one is intended to be used at a time. The object of duplicating them is to permit the side gauge member or members to be set up either on the right or left-hand side of the table, depending upon whether the sheet which is to be handled was originally gauged on its right or left-hand edge. A set screw 13 is provided at the upper part of collar 11 to clamp the rod 12 in any desired position, the required forward extension of such bar in front of the transverse feed bar 2 being determined largely by the length of the sheet which is to be fed between the rolls. If the sheet is long the rod must extend further forward from feed bar 2 in order to support the forward gauge member, generally referred to by the letter E, which is carried by the rod 12, at a position toward the end of the sheet nearest the rolls. The greater the distance of the forward gauge member E from the transverse feed bar, the greater will be the accuracy of its effect in properly aligning the sheet, as will be readily understood. Adjustably mounted along the rod or support 12 is a fitting 14 which is bored at its upper part to receive the said rod and is provided with a set screw 15 whereby its position along the rod may be fixed. The fitting 14 provides the mounting for the disappearing gauge E. The fitting is guided in its fore and aft movement by an elevated guide bar 16 which insures its accurate and non-vibrating reciprocation. The bar 16 passes freely through a suitable guideway in the fitting 14 and is rigidly supported at either end by brackets 17 and 18 which are screwed fast to the platform $d$.

A boss 20 extends downwardly from the lower face of fitting 14, providing a mounting for the pivoted rod or lever 21, at the forward end of which is carried the member which actually engages the edge of the sheet to serve as the forward gauge point. The pivotal connection of lever 21 may be simply provided by a headed pin 22 which passes through the lever and is screwed into boss 20. The gauge member which engages the sheet is preferably a flanged roller 23 mounted for free rotation upon a pin 24 which is threaded into the end of the lever and fixed in adjustment by lock nut 25. The lower end of the pin is formed like the pin 53, shown in Fig. 5, the lower end of the pin being provided with a conical or tapered head to retain the roller in position, as will hereinafter be described. Similarly mounted at the opposite end of lever 21 is a cam roller 26 which co-operates with a cam member 27 suitably formed as a cam-block mounted upon the platform $d$ and having an inclined face 28 (Fig. 1), whereby when the forward gauge member is moved to a predetermined advanced position it will be shifted to the left, as viewed in Fig. 1, and moved out of engagement with the edge of the sheet $c$.

An adjustable stop comprising a screw 30 threaded into a small bracket 31 formed integrally with fitting 14 is provided to positively limit the movement of lever 21 in the direction which causes the gauge roller 23 to move toward the sheet, and a lock nut 32 permits the fixing of stop member 30 in a desired adjustment. A helical spring 33 surrounding boss 20 on fitting 14 engages lever 21 in such manner as to continuously urge the lever against stop 30, so that the gauge roller 23 is normally maintained in a fixed position with respect to the sheet $c$ except when the forward gauge member has been advanced to the position where cam roller 26 engages the inclined surface 28 of the cam block 27, as hereinbefore set forth.

The cam block 27 is adjustably secured in any suitable manner to the platform $d$, as, for example, by means of screws 33' which pass through longitudinal slots 34. By this arrangement the timing of the cam action which causes gauge roller 23 to be moved out of contact with the edge of the sheet may be adjusted so that this disappearing action of the gauge occurs practically simultaneously with the engagement of the sheet by the slitting rolls $a$, $a'$, or until such time in any other type of machine as the primary feeding means is relieved of the duty of advancing and guiding the sheet.

Mounted upon a fitting 40 which is fixed in any desired longitudinal adjustment along rod 12 by means of a set screw 41, is a second gauge wheel or roller 42, the roller being freely carried upon a pin 43 similar to the mounting of roller 23 hereinbefore described. It is not essential that the gauge members which engage one edge of the sheet should be rollers, but this construction is preferred because it facilitates the free and rapid positioning of a blank by the operator. To be accurately located, the blank must be engaged at three different points, and in order to insure perfect contact at all three points it is advantageous to reduce any friction that would interfere with the movement of the sheet, to a minimum. In the construction illustrated, the operator places the sheet $c$ upon the platform and slides it into contact with gauge rollers 23 and 42 and somewhat in advance of transverse feed bar 2. He then moves the sheet rearwardly until it is engaged by one or more gauge points 45 which are adjustably mounted upon the feed bar 2. Inasmuch as the sheet is simply caused to butt against the gauge points 45, it is not necessary that the rear gauge members be in the form of rollers. It is obvious that if it were found more convenient to engage the sheet first with the gauge points mounted upon feed bar 2 and then shifted to one side to engage the side gauge points, rollers similar to gauge rollers 23 and 43 could be provided at the points 45, and in this case there would be no advantage in having rollers at the side, the side gauge points functioning simply as stops.

The gauge points 45, regardless of whether they be simply stops or rollers, are adjustably secured to the feed bar so that they may be moved to the right or left to engage a sheet at points corresponding exactly to the gauge points originally used when the sheet was subjected to some previous process, such as lithographing. It is customary in lithographing sheets to be used in the making of can bodies, for example, to mark upon the margin at the time the sheet is lithographed, the gauge points by which the sheet is positioned in the lithographing machine. With sheets so marked, the adjustment of gauge points 23, 43 and 45 is accomplished simply by shifting such points until they are brought into contact with the previously marked gauge points on the sheet. It will be understood, of course, that the alignment of the sheet with respect to the slitting rolls $a$, $a'$ must be correctly established through the transverse adjustment of guide roller 23 by means of the adjusting screw 30 which determines the position of lever 21 on which the roller is mounted.

To permit of the transverse adjustment of the one or more gauge points 45 mounted upon the transverse feed bar, slots 46 are provided in such bar, the gauge points or members 45 being held in position by screws 47 which pass through the said slots. Where two side gauges are employed, as at 23 and 43, it is only necessary to employ a single rear gauge, this being preferably the gauge member 45 toward the right in Fig. 1, the corresponding left-hand gauge member being removed by simply taking out its retaining screw 47, and this should always be done if the gauging device in the machine which lithographed the sheet, for example, employed only a single gauge point along the rear edge of the sheet. Generally, if the two side gauge points 23 and 43 are taken on the left-hand side of the sheet, the rear gauge point will be located toward the right-hand end of the rear edge because of the fact that the greater the distance between gauge points, the greater will be the accuracy of their gauging or positioning effect, as is well understood. If in the lithographing of the sheet or any other original operation, the sheet is gauged at two points along its rear edge and a third point along one side edge, it is desirable to remove the gauge roller 43 as an inequality in the edge of the sheets at this point would result in a false guiding effect where such point had not been used in the original registration of the sheet in the lithographing machine. Where two gauge points are used at the rear of the sheet, the roller gauge members illustrated in Fig. 5 are preferably employed, for the reasons hereinbefore set forth. These gauge members comprise a simple block 50 which is clamped in any position along slots 46 in feed bar 2 by means of screws 47. Upon the lower face of such block is mounted a flanged roller 51. The roller is provided with a flange 52 like the rollers 23 and 42 hereinbefore described, the object of this flange being to prevent the sheet, in case it is warped, from springing away from the platform and rising above the effective gauging surface of the roller. The roller 51, is freely carried upon a pin 53 which may be threaded into block 50, and held by set nut 54. The portion of this pin which affords a bearing for the roller is preferably enlarged so as to provide a shoulder 55 which engages the lower surface of the block. The pin is also conically flared at its lower end forming a head to retain the roller 51 upon the pin, the flared head of the pin being countersunk in the lower face of the roller so that the roller will lie flat on the surface of the platform $d$ in order to prevent the sheet $c$ from passing underneath.

Assuming that the combined gauge and feed device according to the present invention is applied to a gang slitter of usual type and that the sheets to be cut up into strips are lithographed to provide a plurality of designs which must be accurately located with respect to the edges of the several strips, the operation of the device is as follows: It will be assumed that the lithographed sheet bears arrow marks $x, y, z$ indicating the three points at which the sheet was gauged by three gauge members in the lithographing machine. In this case the fitting 14 is adjusted along the support 12 until guide roller 23 is opposite the arrow $x$ when the sheet $c$ rests against the gauge points $y, z$. The fitting is then secured in position by tightening set screw 15. Gauge roller 42 is then brought to a position where it engages the edge of the sheet at the point $y$ in a similar manner, the fitting 40 being moved along support 12 to the desired position and then secured by tightening set screw 41. Gauge point 45 at the rear edge of the sheet is also adjusted transversely of the feed bar 2 so that it engages the sheet at the marked point $z$. It is better to roughly adjust all three of the gauge members to the points $x, y, z$ before finally adjusting any one of them, as any considerable adjusting movement of one will somewhat affect the adjustment of the others relative to the sheet. The left-hand gauge block 45 (see Fig. 1) is removed where only three gauge points are originally employed when the sheet was lithographed.

After properly adjusting the three gauge members, the transverse feed bar 2 is moved forward until the sheet is advanced to the position where it is gripped between the slitting rolls $a, a'$. With the feed bar and guide points or members connected therewith in such advanced position, cam block 27 is adjusted by loosening screws 33, the slots 34 through which the screws pass permitting the block to slide longitudinally of the table or platform. The cam block is set so that its inclined face 28 in engagement with cam roller 26 will cause gauge roller 23 to move away from the side edge of the sheet simultaneously with the gripping of the sheet between the cutting or slitting rolls.

Ordinarily, when sheets are lithographed care is taken to insure the parallelism of the lithographing with respect to the gauge points used at the side of the sheet, and if this has been done the sheets will be fed into the slitter in proper alignment if a line connecting gauge rollers 23, 42 is parallel to the plane of the slitting rolls, i. e., perpendicular to the axis of the rolls. If the lithographing is not parallel to the gauge points used, it is necessary to adjust gauge roller 23 transversely in order to align the lithographing with the rolls, and this adjustment is simply accomplished by setting adjusting screw 30 to a desired position, the screw acting upon lever 21 to shift the guage roller 23 to the right or left, as required. The lever is retained in contact with the adjusting screw 30 through the action of helical spring 33, as hereinbefore described, except when cam roller 26 engages cam block 27 to cause the transverse shifting or disappearing of the forward gauge member.

It will be understood that even though the cam block 27 controlling the disappearing gauge is not set to cause the gauge to move away from the edge of the sheet immediately upon the engagement of such sheet by the slitting rolls, no material false guiding will result momentarily through the prolonged contact of the forward gauge with the side edge of the sheet, because if a projection or high spot along such edge encounters the roller 23 during the advance of the sheet under the tractive effort of the rolls $a, a'$ the roller will simply accommodate itself to such irregularities, being free to move to the left because of the relatively light tension required in spring 33, which normally maintains the roller in the extreme right-hand position. Obviously, in place of the fixed gauge roller 42, a disappearing gauge similar to the forward gauge illustrated in Fig. 1 may be employed, and this would be desirable if the point $y$ were at any considerable distance from the rear edge of the sheet, as in such case the sheet, in advancing past the gauge member 42, might receive a false guiding effect if the side edge of the sheet were not perfectly true. It will be understood that in accordance with usual practice the slitting rolls a, a' may be axially adjusted to any desired transverse position whereby the width of the strips into which a sheet is cut may be varied as required.

While only a single embodiment of my invention has been hereinbefore described and illustrated, it will be understood that the invention is not limited thereto but may be otherwise variously modified and embodied without departing from the spirit thereof, as set forth in the following claims.

What I claim is:

1. The feeding mechanism according to claim 7, further characterized in that the said guage members are adapted to engage a sheet at three separate points, the said side guage member being in advance of the end gauge members, and the said shifting means being adapted to move such advanced gauge member horizontally out of contact with the side edge of the sheet while the end gauge members continue to advance.

2. A feed gauge for sheet slitting machines and the like, said feed gauge comprising side and end gauge members adapted to accurately locate a sheet placed in contact therewith, reciprocatable means adapted to simultaneously advance said gauge members to thereby feed a sheet into the machine, and side gauge member shifting means actuated in timed relationship with the advance of said gauge members and adapted to move said side gauge member out of contact with the sheet when it reaches a predetermined position, the said shifting means comprising a lever connected to said side gauge and a stationary trip adapted to shift said lever so as to effect a horizontal movement of said gauge member away from the edge of the sheet upon a predetermined movement of the said reciprocatable means for advancing said members.

3. A gauge for sheet slitting machines and the like, said gauge comprising a horizontally movable gauge member adapted to engage the edge of a sheet, sheet slitting means adapted to produce relative movement between said member and said sheet, whereby said member traverses at least a part of one edge of the sheet, yielding means tending to urge said member horizontally toward the edge of the sheet, and stop means to positively limit the movement of said member toward the sheet whereby said member will be normally maintained in a predetermined gauging position with respect to the edge of the sheet, further characterized in that adjusting means are provided whereby the normal gauging position of the said member may be varied transversely of the said edge of the sheet which the member engages.

4. A gauge for sheet slitting machines, said gauge comprising three connected gauge members adapted to accurately feed a sheet between slitting rolls, at least one of said members engaging the side edge of said sheet, a spring urging said member towards said sheet, a stop limiting the movement of said member toward the sheet, and gauge shifting means controlled in accordance with the advance of said sheet, said means being adapted to move the said gauge member away from the edge of the sheet whereby the sheet, in being carried through the slitting rolls, will not be subjected to deflecting forces due to the engagement of said member with irregularities in the side edge of the sheet.

5. A gauge for sheet slitting machines and the like, said gauge including gauge members adapted to accurately position the sheet upon the platform of the machine, the gauge members along at least one edge of the sheet being formed as rollers which freely rotate, whereby the friction of said gauge members is reduced to facilitate the movement of the sheet in contact therewith.

6. The gauge according to claim 5, further characterized in that said rollers are provided with flanges to prevent a sheet from buckling sufficiently to shift out of contact with the gauging face of said rollers.

7. In a machine for slitting rectangular metal sheets, and wherein a pair of slitting rolls is provided between which a sheet may be engaged and thereafter advanced by the frictional contact of said rolls, a feeding mechanism comprising a feed slide adapted to advance a sheet until the latter is gripped between the said rolls, said feed slide including side and rear gauge means adapted to accurately position a sheet placed in contact with said gauge means, and gauge shifting means cooperating with said slide and adapted to move said side gauge means away from the side edge of the sheet after the transverse position of the sheet has been determined by said side gauge means.

8. The feed gauge according to claim 2 further characterized in that the said side gauge member shifting means comprises a trip member adjustably secured to a stationary part of the machine and susceptible of adjustment parallel to the path of feed whereby the timing of the shifting of the said side gauge member may be varied.

9. In a machine for slitting rectangular metal sheets and wherein slitting rolls are provided between which a sheet may be engaged and thereafter advanced by the frictional contact of said rolls, a feeding mechanism comprising slidable feed means adapted to enter a sheet between said rolls, said feed means including side and rear gauge members adapted to engage respectively the lateral edge of the sheet extending substantially parallel to the path of feed, and the rear edge of the sheet lying substantially at right angles to the path of feed, the said gauge members being disposed so that the position of a sheet initially placed in contact therewith will be accurately determined, and actuating means operating in timed relationship with said feed means and adapted to move said side gauge member away from the side edge of the sheet after the position of the sheet has been determined by said gauge members whereby the sheet in its movement through the slitting rolls will be relieved of the deflecting forces which would otherwise occur through the engagement of said side gauge member with irregularities in the side edge of the sheet.

In witness whereof, I have hereunto signed my name.

PETER KRUSE.

Certificate of Correction

Patent No. 1,754,955.

Granted April 15, 1930, to

PETER KRUSE

It is hereby certified that error appears in the printed specification of the above numbered patent requiring correction as follows:

Pages 5 and 6, strike out claims 1 to 9 as given and insert instead claims 1 to 9, as follows:

1. In a machine for slitting rectangular metal sheets, and wherein a pair of slitting rolls is provided between which a sheet may be engaged and thereafter advanced by the frictional contact of said rolls, a feeding mechanism comprising a feed slide adapted to advance a sheet until the latter is gripped between the said rolls, said feed slide including side and rear gauge means adapted to accurately position a sheet placed in contact with said gauge means, and gauge shifting means cooperating with said slide and adapted to move said side gauge means away from the side edge of the sheet after the transverse position of the sheet has been determined by said side gauge means.

2. The feeding mechanism according to claim 1, further characterized in that the said gauge members are adapted to engage a sheet at three separate points, the said side gauge member being in advance of the end gauge members, and the said shifting means being adapted to move such advanced gauge member horizontally out of contact with the side edge of the sheet while the end gauge members continue to advance.

3. In a machine for slitting rectangular metal sheets and wherein slitting rolls are provided between which a sheet may be engaged and thereafter advanced by the frictional contact of said rolls, a feeding mechanism comprising slidable feed means adapted to enter a sheet between said rolls, said feed means including side and rear gauge members adapted to engage respectively the lateral edge of the sheet extending substantially parallel to the path of feed, and the rear edge of the sheet lying substantially at right angles to the path of feed, the said gauge members being disposed so that the position of a sheet initially placed in contact therewith will be accurately determined, and actuating means operating in timed relationship with said feed means and adapted to move said side gauge member away from the side edge of the sheet after the position of the sheet has been determined by said gauge members whereby the sheet in its movement through the slitting rolls will be relieved of the deflecting forces which would otherwise occur through the engagement of said side gauge member with irregularities in the side edge of the sheet.

4. A feed gauge for sheet slitting machines and the like, said feed gauge comprising side and end gauge members adapted to accurately locate a sheet placed in contact therewith, reciprocatable means adapted to simultaneously advance said gauge members to thereby feed a sheet into the machine, and side gauge member shifting means actuated in timed relationship with the advance of said gauge members and adapted to move said side gauge member out of contact with the sheet when it reaches a predetermined position, the said shifting means comprising a lever connected to said side gauge and a stationary trip adapted to shift said lever so as to effect a horizontal movement of said gauge member away from the edge of the sheet upon a predetermined movement of the said reciprocatable means for advancing said members.

5. The feed gauge according to claim 4 further characterized in that the said side gauge member shifting means comprises a trip member adjustably secured to a stationary part of the machine and susceptible of adjustment parallel to the path of feed whereby the timing of the shifting of the said side gauge member may be varied.

6. A gauge for sheet slitting machines, said gauge comprising three connected gauge members adapted to accurately feed a sheet between slitting rolls, at least one of said members engaging the side edge of said sheet, a spring urging said member towards said sheet, a stop limiting the movement of said member toward the sheet, and gauge shifting means controlled in accordance with the advance of said sheet, said means being adapted to move the said gauge member away from the edge of the sheet whereby the sheet, in being carried through the slitting rolls, will not be subjected to deflecting forces due to the engagement of said member with irregularities in the side edge of the sheet.

7. A gauge for sheet slitting machines and the like, said gauge comprising a horizontally movable gauge member adapted to engage the edge of a sheet, sheet slitting means adapted to produce relative movement between said member and said sheet, whereby said member traverses at least a part of one edge of the sheet, yielding means tending to urge said member horizontally toward the edge of the sheet, and stop means to positively limit the movement of said member toward the sheet whereby said member will be normally maintained in a predetermined gauging position with respect to the edge of the sheet, further characterized in that adjusting means are provided whereby the normal gauging

*position of the said member may be varied transversely of the said edge of the sheet which the member engages.*

*8. A gauge for sheet slitting machines and the like, said gauge including gauge members adapted to accurately position the sheet upon the platform of the machine, the gauge members along at least one edge of the sheet being formed as rollers which freely rotate, whereby the friction of said gauge members is reduced to facilitate the movement of the sheet in contact therewith.*

*9. The gauge according to claim 8, further characterized in that said rollers are provided with flanges to prevent a sheet from buckling sufficiently to shift out of contact with the gauging face of said rollers.* and that the said Letters Patent should be read with this correction therein that the same may conform to the record of the case in the Patent Office.

Signed and sealed this 2nd day of September, A. D. 1930.

[SEAL.]

M. J. MOORE,
*Acting Commissioner of Patents.*